United States Patent [19]

Gneiss

[11] Patent Number: 4,887,462

[45] Date of Patent: Dec. 19, 1989

[54] AIR FLOW RATE METER

[75] Inventor: Heinz Gneiss, Ludwigsburg, Fed. Rep. of Germany

[73] Assignee: Robert Bosch GmbH, Stuttgart, Fed. Rep. of Germany

[21] Appl. No.: 281,717

[22] Filed: Dec. 9, 1988

[30] Foreign Application Priority Data

Feb. 16, 1988 [DE] Fed. Rep. of Germany ....... 3804797

[51] Int. Cl.$^4$ .............................................. G01F 1/68
[52] U.S. Cl. ................................. 73/118.2; 73/204.22
[58] Field of Search ............ 73/118.2, 204.21, 204.22; 123/494

[56] References Cited

U.S. PATENT DOCUMENTS 4,299,724 11/1981 Knapp et al. ..................... 73/116 X
4,322,970 4/1982 Peter ................................... 73/118.2
4,561,302 12/1985 Sumal et al. .................. 73/118.2 X

FOREIGN PATENT DOCUMENTS 3326047 1/1985 Fed. Rep. of Germany .

Primary Examiner—Jerry W. Myracle
Attorney, Agent, or Firm—Edwin E. Greigg

[57] ABSTRACT

An air flow rate meter having a support body that protrudes into the air intake tube of an internal combustion engine and has an aperture in which a hot wire is deployed over support points. A support body protrudes vertically into a horizontally extending intake tube with two apertures, one above the other, and includes both a first hot wire in the first aperture and a second hot wire in the second aperture, each in the form of a V, with the required tension. Each hot wire is secured with each of its ends to a respective support point and is guided with a loop over a middle support point. It is particularly advantageous to dispose the ends of each hot wire with the support points on the upper end face of each aperture, because in that case the heat buildup ensuing during a burn-off procedure enables particularly good burnoff of the deposits on the ends of each hot wire and any solder at the intersections of the individual loops is protected from overheating which would destroy the solder. The air flow rate meter is suitable in principle for measuring any flowing medium.

10 Claims, 1 Drawing Sheet

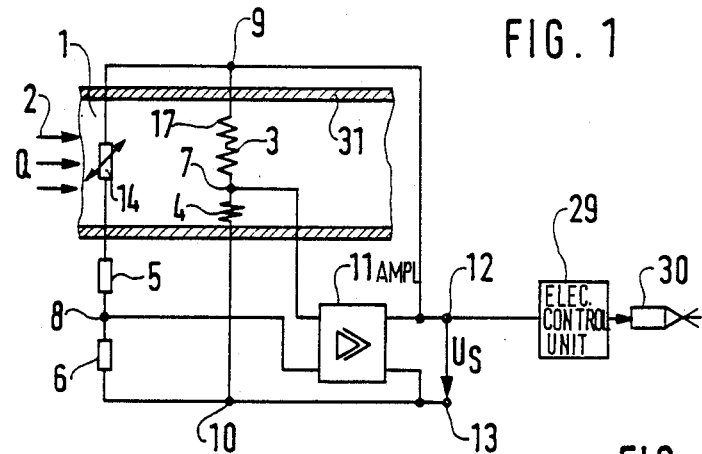
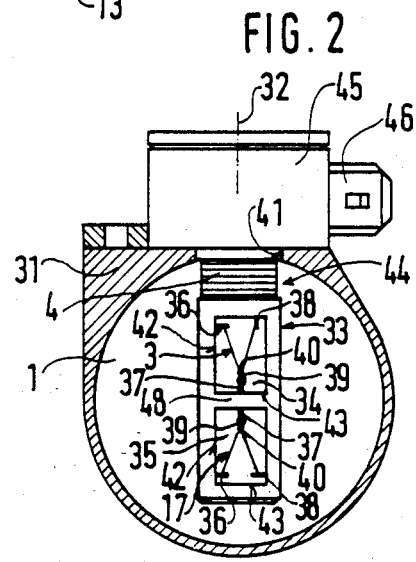
FIG. 1
FIG. 2
FIG. 3

AIR FLOW RATE METER

BACKGROUND OF THE INVENTION

The invention is based on an air flow rate meter for internal combustion engines. An air flow rate meter is already known (German Offenlegungsschrift No. 33 26 047), which however has the problem that the single long hot wire in the single aperture must be biassed to a sufficient magnitude as to assure that the hot wire will remain taut even during a required burn-off procedure.

OBJECT AND SUMMARY OF THE INVENTION

The air flow rate meter according to the invention has an advantage over the prior art in that it enables a deployment of the hot wires required for long-term operation of the air flow rate meter such that even a very high number of burn-off procedures during the expected service life of the air flow rate meter will at most impair its measurement outcome or function to only an insignificant degree.

An advantage of the invention is that the apertures are disposed one above the other in the direction of the longitudinal axis of the support body, resulting in a slender form of the support body protruding into the intake tube of the internal combustion engine, enabling the support body to be threaded into the intake tube through small openings in its wall.

It is particularly advantageous to insert the support body with the apertures vertically into the horizontal intake tube, and to deploy each hot wire in the shape of a V at three support points in each aperture, such that the loop of each hot wire is disposed facing the lower end face of each aperture. As a result, during a burn-off procedure, the solder at the intersection of the wire segments forming the loop is not further heated by the heat as it rises; such heating causes coarse granulation of the solder, which lessens its strength. Instead, the rising heat is utilized to assure adequate burnoff of the wire ends at their support port points, where relatively good dissipation of heat from the wire takes place.

It is also advantageous to connect the hot wires electrically in series with one another.

Another advantage is attained by embodying the apertures with a rectangular cross section.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 is a diagram of the circuitry of an air flow rate meter;

FIG. 2 shows a first exemplary embodiment of an air flow rate meter according to the invention; and FIG. 3 is a fragmentary view showing a second exemplary embodiment of an air flow rate meter according to the invention.

DESCRIPTION OF THE PREFERRED EMBODIMENTS

The drawing shows a flow cross section 1, for example an air intake tube of an internal combustion engine, not shown, through which a medium, such as air aspirated by the engine, flows in the direction of the arrows 2. Located in the flow cross section 1, for example, as part of an air flow rate meter, are a temperature-dependent measuring resistor embodied as a first hot wire 3 and another temperature-dependent measuring resistor, embodied as a second hot wire 17, electrically connected in series with the first resistor. The output variable of a controller flows through these resistors, and at the same time they furnish the input variable for the regulator. The temperature of the hot wires 3, 17 is regulated by the controller to a fixed value which is above the mean air temperature. If the flow velocity, that is, the quantity of air flowing per unit of time at a flow value of $\dot{Q}$, increases, then the hot wires 3, 17 cool down to a more marked extent. This cooling is fed back to the input of the controller, causing it to raise its output variable such that the fixed temperature value is re-established at the hot wires 3, 17. The output variable of the controller regulates the temperature of the hot wires 3, 17 to the predetermined value, if the air flow value $\dot{Q}$ increases, and at the same time represents a standard for the quantity of flowing air, which as a measured flow values $U_S$ can for instance be supplied to a metering circuit of an engine, so that the required fuel quantity can be adapted to the quantity of air aspirated per unit of time.

The hot wires 3, 17 are disposed in a resistor measuring circuit, for instance a bridge circuit, and together with a reference resistor 4 they form a first bridge branch, to which a second bridge branch, comprising the two fixed resistors 5 and 6, is connected in parallel. One pickup point 7 is located between the hot wires 3, 17 and the resistor 4, and another pickup point 8 is located between the resistors 5 and 6. The two bridge branches are connected in parallel at points 9 and 10. The diagonal voltage of the bridge appearing between points 7 and 8 is supplied to the input of an amplifier 11, to the output terminals of which the points 9 and 10 are connected, so that its output variable supplies the bridge with operating voltage or operating current. The measured flow value $U_S$ simultaneously serving as a correcting variable can be picked up, as suggested in the drawing, between terminals 12 and 13.

The hot wires 3, 17 are heated by the current flowing through them up to the value at which the input voltage of the amplifier 11, that is, the bridge diagonal voltage, becomes zero or assumes a predetermined value. A certain current then flows from the output of the amplifier 11 into the bridge circuit. If the temperature of the hot wires 3, 17 changes because of changes in the quantity $\dot{Q}$ of the flowing air, then the voltage of the bridge diagonal changes as well, and the amplifier 11 regulates the bridge supply voltage or current to a value at which the bridge is again balanced, or is imbalanced in a predetermined manner. Both the output variable of the amplifier 11, i.e., the controlled variable $U_S$, and the current in the hot wires 3, 17 represent a flow value for the flowing air quantity, for instance the quantity of air aspirated by an internal combustion engine, and can be supplied to an electronic control unit 29, which for instance triggers at least one fuel injection valve 30.

To compensate for the effect of the air temperature on the result of measurement, it may be useful to incorporate a temperature-dependent compensating resistor 14, around which the air flows, into the second bridge branch. The resistance of the resistors 5, 6 and 14 should be selected such that the power loss of the temperature-dependent compensating resistor 14 generated by the branch flow flowing through it is low enough that the temperature of the compensating resistor 14 varies virtually not at all with the variations of the bridge voltage but instead is always equivalent to the temperature of the air flowing past it. The reference resistor 4 is suitably also disposed in the flow cross section 1 or is thermally conductively connected to the wall 31 of the air intake tube that defines the flow cross section, so that the lost heat of the reference resistor 4 can be dissipated by the flowing air or by the wall 31.

FIG. 2 shows a first exemplary embodiment of the air flow rate meter according to the invention, the electrical circuitry of which is shown in FIG. 1. The air intake tube 1 with the wall 31 should extend horizontally, and the air should flow at right angles to the plane of the drawing. Protruding through an opening 41 in the wall 31 is a support body 33, which is preferably slender and cylindrical to a vertically extending longitudinal axis 32. The support body 33 is provided with a first aperture 34 and a second aperture 35, located one above the other. Each of the apertures 34, 35 is preferably of rectangular cross section, with side walls extending parallel to the flow direction 2. In the first aperture 34, the first hot wire 3 is guided in the shape of a V from one support point 36 over a middle support point 37 to a third support point 38. One end of each hot wire 3, 17 is electrically conductively secured to the support point 36, preferably being soldered or welded, while the other end of each hot wire is electrically conductively secured to the support point 38 in the same manner. Each of the hot wires 3, 17 is guided in the form of a loop 37 over its respective middle support point 37. This kind of suspension of a hot wire by means of a loop is known from German patent No. 28 45 662, so that it need not be described in further detail here. The two intersecting wire segments of each loop 39 of each separate hot wire 3, 17 are soldered together at their intersection 40. The preferably rectangular apertures 34, 35 have longer side faces 42 extending parallel to the longitudinal axis 32 and shorter end faces 43 extending at right angles to the longitudinal axis 32.

The reference resistor 4 is preferably embodied by a resistor wire, which is wound on a portion 44 of the support body 33 that also protrudes into the flow cross section. The reference resistor 4 is spaced apart from the first aperture 34 on the support body.

The end of the support body 33 remote from the first aperture 34 is connected to a circuit housing 45, which is supported on the wall 31 outside the air intake tube 1 and has an electrical plug connection 46 for supplying current and emitting signals. The support body 33 is preferably embodied as an injection-molded plastic part and has a web 48 between the first aperture 34 and the second aperture 35. The support points 36, 37, 38 are injected into the support body 33 embodied as a plastic injection-molded part and thus are supported in an electrically insulated manner. In the case that support points 36, 37, 38 are made of wire, the wire has a diameter of approximately 0.4 mm. The middle support point 37 is advantageously bent into a hook so that it protrudes through the associated loop 39 of a hot wire 3, 17. Each hot wire 3, 17, which is preferably made of platinum wire, has a diameter of approximately 0.07 mm. Deploying each hot wire 3, 17 in the shape of a V, with each of the loops 39 supported in the vicinity of one of the face ends 43 of each aperture 34, 35, while the ends of each hot wire 3, 17 are supported in the vicinity of the opposite end faces 43 of each aperture 34, 35, makes it possible in these apertures, because of the short wire segments, to exert sufficient tension for measurement operation in the air intake tube of an internal combustion engine, which tension is maintained sufficiently even during the burn-off procedure which is required in order to remove deposits from each hot wire. During the burnoff procedure, which is for instance known from German patent No. 28 45 662, each hot wire 3, 17 is heated above its normal operating temperature, which is 120° C., for example, to approximately 1000° C., so that deposits that have become stuck to the surface of each hot wire are burned off. Deposits on the hot wires cause an undesirable change in the characteristic curve of the air flow rate meter, so that the removal of these deposits from the hot wires assures accurate measurement of the aspirated air over a long service life of the air flow rate meter.

The hot wires 3, 17 are advantageously disposed symmetrically to the longitudinal axis 32 of the support body 33 and in one embodiment can be disposed with their loops 39 facing one another, or in other words deployed in the vicinity of the web 48, so that when the support body 33 is disposed verticaly to the horizontally extending air intake tube 1, the ends of the first hot wire 3 point upward and the ends of the second hot wire 17 point downward. It has been found that if the first hot wire 3 is disposed in the first aperture 34, with a loop 39 located under the wire ends, the service life is increased substantially over the case where the second hot wire 17 is disposed in the second aperture 35 with a loop 39 disposed above the wire ends, as shown. This phenomenon is due to the fact that in a burn-off procedure, the heat generated rises to the upper end face 43 of each aperture 34, 35, so that with the disposition of the first hot wire 3 in the first aperture 34 as shown, sufficient heating of the wire ends is attained, which assures virtually residue-free combustion of the deposits on the wire ends while the relatively large cross section of the support points 36, 38, by dissipating enough heat, prevents overheating of the soldered connection. Overheating of the solder at the intersection 40 of the loop 39 is avoided in this arrangement.

In the case where the second hot wire 17 is disposed as shown in the second aperture 35, the rising heat during a burn-off procedure results in a heat buildup zone about the loop 39 in the vicinity of the web 48, which causes undesirable overheating of the solder at the intersection 40 of the loop 39 and causes coarse granulation, which during operation can cause an undesirable premature destruction of the soldered connection even after only a few thousand burn-off procedures. On the other hand, with this arrangement, a relatively large amount of heat is removed from the wire ends by the support points 36, 38 during the burn-off procedure, so that the temperature there is not sufficient to burn off all the deposits in a region of the hot wire located near the support points 36, 38, which has an undesirable effect on the characteristic curve of the air flow rate meter. The loop 39, contrarily, is electrically short-circuited, and thus transfers a substantially lesser quantity of heat to the middle support point 37 via the small wire diameter.

As a consequence of this finding, the improved second exemplary embodiment of the invention shown in FIG. 3 is chosen, in which identical parts, functioning the same as those of FIGS. 1 and 2, are identified by the same reference numerals. In this embodiment, the two hot wires 3, 17 are disposed in their respective apertures 34, 35 such that they are deployed in a V as before but now extend in the same direction, so that the loop 39 of each hot wire 3, 17 is located at the lower end of each aperture 34, 35, while the wire ends at the support points 36, 38, given a support body 33 disposed vertically in a horizontally extending air intake tube 1, are disposed in the apertures 34, 35 in the vicinity of the upper end faces 43. An important consideration in this arrangement is that the ends of both hot wires 3, 17 are located in the vicinity of the heat buildup that takes place at the upper end of each aperture, which effects substantially better burnoff of the deposits at these wire ends, while the intersections 40 do not overheat, so that coarse granulation and destruction of the solder at these intersections 40 is avoided.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An air flow rate meter for measuring the quantity of air aspirated by internal combustion engines, having a support body extending transversely to the air flow direction, said support body including a first aperture extending parallel to the air flow direction, a first hot wire secured in said first aperture with each of its ends and middle connected to respective end and middle support points, said first hot wire forming a loop at its middle support point in which intersecting wire segments are connected electrically conductively to one another and through which loop the middle support point protrudes, a second aperture (35) is embodied parallel to the first aperture (34) in the support body (33) and extends parallel to the air flow direction (2) and is separated from said first aperture 934) by a web (48) of the support body (33), a second hot wire (17) supported in said second aperture and electrically connected to said first hot wire (3), said second hot wire (17) is supported and retained by support points (36, 37, 38) such that each of its ends is connected to a respective support point (36, 38) and is retained and supported between its ends by a loop (39) in which intersecting wire segments of the loop are connected electrically conductively to one another and supported by at least one middle support point (37), which protrudes through the loop (39).

2. An air flow rate meter as defined by claim 1, in which said apertures (34, 35) of said support body have a rectangular cross section.

3. An air flow rate meter as defined by claim 2, in which said hot wires 93, 17) are connected to one another electrically in series.

4. An air flow rate meter as defined by claim 1, in which said apertures (34, 35) are disposed one above the other in a direction of a longitudinal axis (32) of the support body (33).

5. An air flow rate meter as defined by claim 4, in which said support body (33) having the apertures (34, 35) protrudes vertically into the horizontally extending air intake tube 91) and each hot wire (3, 17) is deployed in the form of a V on three support points (36, 37, 38) in the respective aperture (34, 35) such that the loop (39) of each hot wire (3, 17) is disposed facing a lower end face 943) of each aperture 934, 35).

6. An air flow rate meter as defined by claim 5, in which said hot wires (3, 17) are connected to one another electrically in series.

7. An air flow rate meter as defined by claim 4, in which said support body (33) having the apertures (34, 35) protrudes vertically into the horizontally extending air intake tube (1) and each hot wire (3, 17) is deployed in the form of a V on three support points (36, 37, 38) in the respective aperture (34, 35) such that the loop (39) of each hot wire (3, 17) is disposed facing said web (48).

8. An air flow rate meter as defined by claim 7, in which said hot wires (3, 17) are connected to one another electrically in series.

9. An air flow rate meter as defined by claim 4, in which said hot wires (3, 17) are connected to one another electrically in series.

10. An air flow rate meter as defined by claim 1, in which said hot wires (3, 17) are connected to one another electrically in series.

* * * * *